US010773766B2

(12) United States Patent
Stanger

(10) Patent No.: US 10,773,766 B2
(45) Date of Patent: Sep. 15, 2020

(54) OMNI-DIRECTIONAL SELF-ORIENTING BREAKAWAY HAND GUARDS

(71) Applicant: Takie Adonis Stanger, Boise, ID (US)

(72) Inventor: Takie Adonis Stanger, Boise, ID (US)

(*) Notice: Subject to any disclaimer, the term of this patent is extended or adjusted under 35 U.S.C. 154(b) by 0 days.

(21) Appl. No.: 16/404,356

(22) Filed: May 6, 2019

(65) Prior Publication Data

US 2019/0337583 A1 Nov. 7, 2019

Related U.S. Application Data

(60) Provisional application No. 62/666,850, filed on May 4, 2018.

(51) Int. Cl.
*B62J 17/02* (2006.01)
*B62J 23/00* (2006.01)
*B62K 21/12* (2006.01)

(52) U.S. Cl.
CPC .............. *B62J 17/02* (2013.01); *B62J 23/00* (2013.01); *B62K 21/125* (2013.01)

(58) Field of Classification Search
CPC ... B62J 17/02; B62J 17/04; B62J 17/06; B62J 23/00; B62K 21/12; B62K 21/125
See application file for complete search history.

(56) References Cited

U.S. PATENT DOCUMENTS

| | | | | |
|---|---|---|---|---|
| 3,801,152 | A | * | 4/1974 | Tims ........................ B62J 17/04 296/78.1 |
| 3,904,238 | A | * | 9/1975 | Anderson ................ B62J 17/04 296/78.1 |
| 4,479,663 | A | * | 10/1984 | Morris ..................... B62J 17/04 296/78.1 |
| 8,534,159 | B2 | * | 9/2013 | Laivins .................... B62J 17/00 74/551.8 |
| 2007/0062326 | A1 | * | 3/2007 | Laivins .................... B62J 27/00 74/551.8 |
| 2008/0203762 | A1 | * | 8/2008 | Shimanski ............... B62J 23/00 296/180.1 |
| 2009/0314125 | A1 | * | 12/2009 | Mentasti .................. B62J 23/00 74/551.8 |
| 2012/0234129 | A1 | * | 9/2012 | Adan ....................... B62J 23/00 74/551.8 |
| 2014/0260772 | A1 | * | 9/2014 | Dion ..................... B62K 21/125 74/551.8 |

FOREIGN PATENT DOCUMENTS

EP    2384960 A1 * 11/2011    .............. B62J 23/00

* cited by examiner

*Primary Examiner* — Adam D Rogers
(74) *Attorney, Agent, or Firm* — Innovative Law, PLLC

(57) ABSTRACT

An omni-directional self-orienting hand guard for a motorcycle, ATV, snowmobile or other vehicle having handlebars. The hand guard will deflect or breakaway under an applied force such as a crash. The hand guard can re-position and re-orient itself once the applied force is removed. Apparatus and method claims are provided.

19 Claims, 4 Drawing Sheets

OMNI-DIRECTIONAL SELF-ORIENTING BREAKAWAY HAND GUARDS

CROSS REFERENCE TO RELATED APPLICATIONS

The present application claims priority in and to U.S. patent application 62/666,850 filed May 4, 2018, and further is incorporated herein by reference.

TECHNICAL FIELD

The presently disclosed technology relates to hand guards that are capable of deflecting or breaking away under force, and thereafter self-orienting to their original position, and more specifically to hand guards on motorcycles, snowmobiles or other handlebar-controlled vehicles.

BACKGROUND

Hand guards on motorcycles and other off-road vehicles serve an important role to protect a user's hands from injury. Hand guards come in a variety of sizes, shapes and materials.

One form of hand guards is in the form of convex outer surface guard typically made of plastic which protects the rider's hand from wind, mud, stones, gravel and other dangerous projectiles thrown by the rear wheels of vehicles in front. Such hand guards are also useful for protecting the user's hand from brush the rider may be passing through. Hand guards may also provide protection for the hand and brake and clutch levers when the rider is involved in a crash. Since other vehicles besides motorcycles also have handlebars, such as ATVs, off-road vehicles, snowmobiles, bicycles, and other wheeled, tracked or other vehicles, hand guards are also typically found on such vehicles.

The safety concern with hand guards on handlebars is that in the case that the rider is thrown over the handlebars, the hands can become entrapped in the hand guards, which could cause severe injury, most commonly resulting in a broken wrist.

Prior art evidences a number of approaches to attempt to protect a user's hands from external injury such as rocks, trees or other objects which could strike a user's hands. However, the prior art fails to address the prospect that the user's hands are caught in the hand guard on an impact or crash. Therefore, prior art hand guards can become directly responsible for the injury of the user's hands, wrists or arms—opposite the purpose for which they are intended.

I have in fact suffered from such an impact and injury while riding a motorcycle with traditional hand guards. In fact, I broke my wrist due to my hand being caught in the traditional, non-breakaway hand guard upon a severe crash.

With that motivation, I previously created a first generation of flexible wraparound style hand guards, as evidenced by U.S. Pat. No. 9,499,225. That breakthrough hand guard served to address wraparound style hand guards, also known in the dirt biking community as "bark busters." However, what is needed in the art is a breakaway hand guard that is not a wraparound style, but an open-ended style.

SUMMARY

The present disclosure describes apparatus and methods to manufacture a omni-directional self-orienting breakaway hand guard suitable for a motorcycle, ATV, snowmobile, bicycle or other conventional vehicle typically having handlebars as a steering device.

In one aspect, embodiments of a omni-directional self-orienting breakaway hand guard mounted on handlebars are disclosed, comprising: a handlebar clamp attachment member, the handlebar clamp attachment member further comprising a handlebar clamp and one or more handlebar clamp bolts, the handlebar clamp and the one or more handlebar clamp bolts securing the handlebar clamp attachment member to the handlebars; a shield attachment member, the shield attachment member further comprising a shield and one or more shield attachment bolts, the one or more shield attachment bolts securing the shield to the shield attachment member; a main chassis, wherein the main chassis may be attached to the shield attachment member via a shield attachment member bolt and wherein the main chassis and the handlebar clamp attachment member communicate via a pair of mated surfaces, wherein the pair of mated surfaces comprises a first mated surface on the main chassis and a second mated surface on the handlebar clamp attachment member; and a shaft assembly passing through the main chassis and the handlebar clamp attachment member, thereby creating elastic compression between the main chassis and the handlebar clamp attachment member to place the shield attachment member in a desired position and orientation with respect to the handlebar clamp attachment member. The first mated surface may be a plug and the second mated surface may be a socket configured to accommodate the first mated surface. The first mated surface may be shaped as a multi-sided pyramid, and the second mated surface may be shaped to accommodate the first mated surface. The first mated surface may be shaped as a four-sided pyramid, and the second mated surface may be shaped to accommodate the first mated surface. The shaft assembly may further comprise a first end, a flexible middle portion, and a second end. The flexible middle portion may be a cable, and the flexible middle portion of cable may be swaged to the first end and second end. The second end of the shaft assembly may be threaded, and the shaft assembly may further comprise a nut to secure the shaft assembly within the handlebar clamp attachment member and the main chassis. The shaft assembly may comprise a spring to provide elastic compression.

In another aspect, embodiments of a method of assembling a omni-directional self-orienting breakaway hand guard are disclosed, comprising steps of: providing a handlebar clamp attachment member, the handlebar clamp attachment member having a first mated surface; providing a main chassis, the main chassis having a second mated surface; providing a shield attachment member and a shaft assembly; securely attaching the main chassis to the shield attachment member; installing the shaft assembly through the handlebar clamp attachment member and the main chassis, wherein the first mated surface and the second mated surface are in a mated configuration, and wherein the handlebar clamp attachment member and the main chassis communicate under compression. The method may further comprise attaching a shield to the shield attachment member with one or more shield attachment bolts. The step of securely attaching the main chassis to the shield attachment member may be via a shield attachment member bolt. The method may further comprise attaching a shield to the shield attachment member using one or more shield attachment bolts. The shaft assembly may comprise a first end, a second end and a middle flexible portion. The middle flexible portion may be a cable, further comprising steps of: (i) swaging the cable to the first end and (ii) swaging the cable to the second end. The shaft assembly may comprise a first end, a threaded second end and a middle flexible portion. Installing the shaft assembly may further comprises steps of: (i) inserting the shaft assembly through the handlebar clamp attachment member and the main chassis, and (ii) attaching a nut to the threaded second end. The shaft assembly may comprise a first end, a threaded second end and a middle flexible portion, and wherein the step of installing the shaft assembly further comprises steps of: (i) inserting the shaft assembly through the handlebar clamp attachment member and the main chassis, (ii) inserting a spring on the shaft assembly, and (iii) attaching a nut to the threaded second end. The method may further comprise installing a shaft assembly set screw after installing the shaft assembly. The step of securely attaching the main chassis to the shield attachment member may be with a shield attachment member bolt; the shaft assembly may comprise a first end, a threaded second end and a middle flexible portion, wherein the middle flexible portion may be a cable; the step of installing the shaft assembly may further comprise steps of: (i) inserting the shaft assembly through the handlebar clamp attachment member and the main chassis, (i) inserting a spring on the shaft assembly, and (iii) attaching a nut to the threaded second end; and the method may further comprise steps of: attaching a shield to the shield attachment member with one or more shield attachment bolts; swaging the cable to the first end; swaging the cable to the threaded second end; and installing a shaft assembly set screw after installing the shaft assembly.

In yet another aspect, embodiments of a omni-directional self-orienting breakaway hand guard mounted on handlebars are disclosed, comprising: a handlebar clamp attachment member, the handlebar clamp attachment member further comprising a handlebar clamp and one or more handlebar clamp bolts, the handlebar clamp and the one or more handlebar clamp bolts securing the handlebar clamp attachment member to the handlebars; a shield attachment member, the shield attachment member further comprising a shield and one or more shield attachment bolts, the one or more shield attachment bolts securing the shield to the shield attachment member; a main chassis, wherein the main chassis may be attached to the shield attachment member via a shield attachment member bolt and wherein the main chassis and the handlebar clamp attachment member communicate via a pair of mated surfaces, wherein the pair of mated surfaces comprises a first mated surface on the main chassis and a second mated surface on the handlebar clamp attachment member, wherein the first mated surface may be a plug and the second mated surface may be a socket shaped to accommodate the first mated surface; and a shaft assembly passing through the main chassis and the handlebar clamp attachment member, the shaft assembly comprising a first end, a flexible middle portion, a threaded second end, a spring to provide elastic compression and a nut; wherein the flexible middle portion comprises a cable, the cable swaged to the first end and the cable swaged to the threaded second end; wherein the nut secures the shaft assembly within the handlebar clamp attachment member and the main chassis; and, wherein the shaft assembly creates elastic compression between the main chassis and the handlebar clamp attachment member to place the shield attachment member in a desired position and orientation with respect to the handlebar clamp attachment member.

BRIEF DESCRIPTION OF THE DRAWINGS

Embodiments of the invention are illustrated by way of example, and not by way of limitation, in the figures of the accompanying drawings and in which like reference numerals refer to similar elements, wherein.

DETAILED DESCRIPTION

Figure 1:
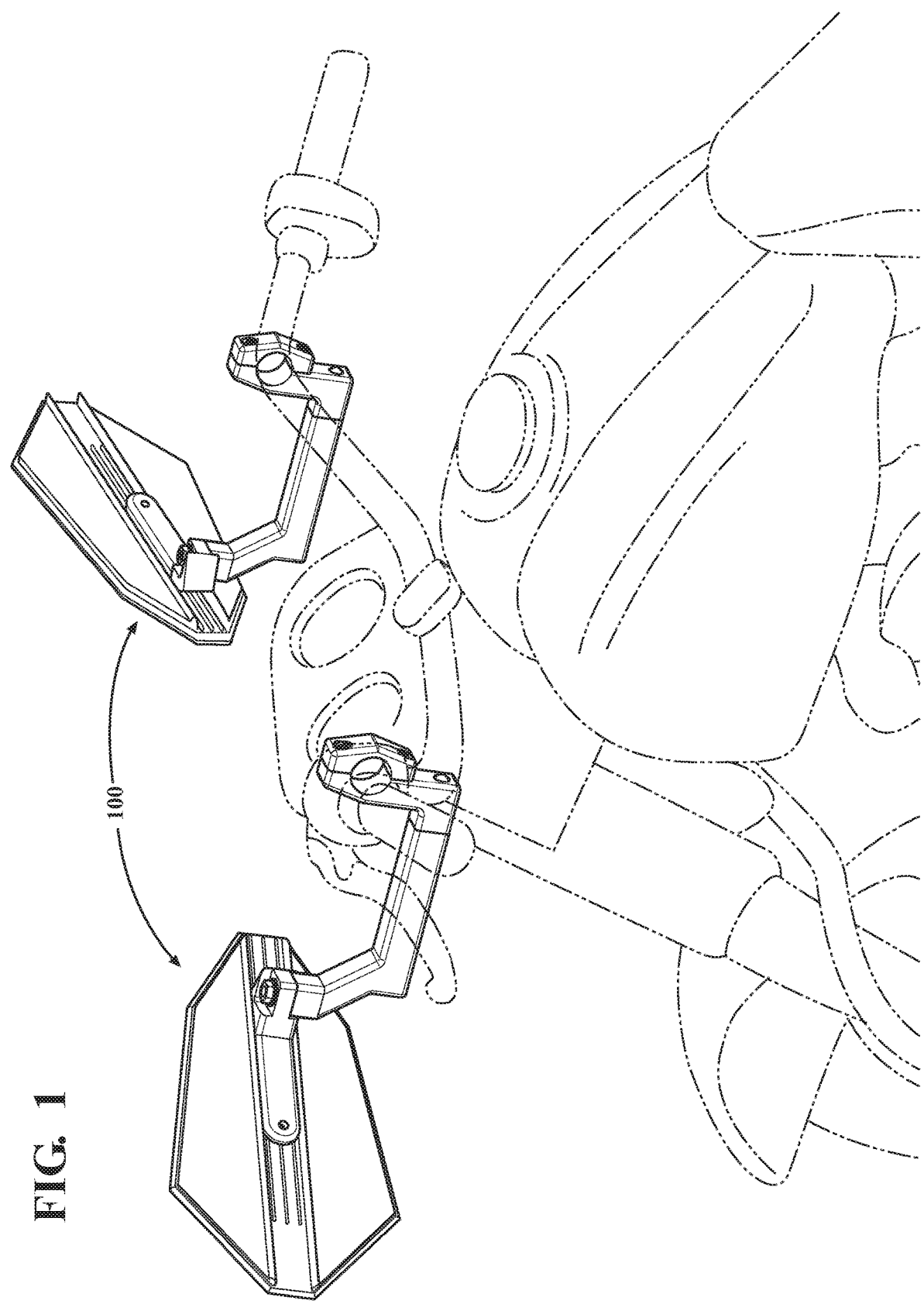
FIG. 1 is an environmental view of an embodiment of a pair of omni-directional self-orienting breakaway hand guards.

In the following description, for the purposes of explanation, specific details are set forth in order to provide a thorough understanding of the invention. However, it will be apparent that the invention may be practiced without these specific details. In other instances, well-known structures and devices may be depicted in block diagram form or simplified form in order to avoid unnecessary obscuring of the invention. Section titles and references appearing within the following paragraphs are intended for the convenience of the reader and should not be interpreted to restrict the scope of the information presented at any given location. As such, various aspects and features of example embodiments of the invention are described in more detail hereinafter in the following sections.

This disclosure presents my improved hand guard for a vehicle that has a handlebar, such as a motorcycle, that is designed to disengage or breakaway in any direction necessary in the event of a crash to minimize injury to the hand of the user. As noted above, the context of a motorcycle has been chosen to demonstrate and illustrate embodiments of the present invention, but other trades and contexts can be applied with equal effectiveness. Embodiments are also applicable to ATVs, off-road vehicles, snowmobiles, bicycles, tracked vehicles or any other vehicles which have handlebars.

Embodiments of my disclosed invention are intended to be bolted onto the handlebars of the vehicle but can be welded or secured with other conventional means. The hand guard is located at a position to allow a user's hand to grasp the handlebar and operate the motorcycle controls without contacting the hand guard.

Embodiments of the disclosed invention provide protection for a user's hand during ordinary use, while designed in extraordinary circumstances to breakaway when the vehicle is struck with a significant, active force such as an impact or crash. More particularly, when such an active force is applied to the hand guard from any direction (e.g. the hand, wrist or arm impacting it during a crash), my hand guard will disengage from its seated position on the handlebars. The active force can occur from any direction—and the hand-guard will disengage in a limited amount (e.g. for a limited distance and angle of deflection) in any direction—then return itself back to its original, resting, intended position once the force has been removed. The above described disengagement or breakaway state by the hand guard is intended to prevent the hand, wrist or arm from being injured by being stuck in the hand guard or any substantial impact against the hand guard.

Embodiments of the disclosed invention generally achieve omni-directional disengagement and self-orientation, without limitation, through the combination of a plurality (e.g. a pair) of mated surfaces or contact points held together by a flexible shaft assembly. The flexible, shaft assembly preferably comprises a plurality of solid cylindrical dowels (e.g. metal) at each end held together by a segment of flexible cable (e.g. metal) swaged into the end dowels. A spring offers tension or compression such that it communicates with the shaft assembly and thereby causes the pair of mated surfaces to be adjacent to one another in compression (via the tension or compression means). Of course, while a metal spring is a preferable option in my current prototypes, other conventional means of tension or compression can be implemented with equal success, such as non-metallic springs, elastomer or rubber materials, etc.—any material which can offer substantial elastic tension or compression. Herein, if a "spring" is referenced throughout this disclosure, it is assumed that such a spring could be any conventional means for compression or tension.

When an active force acts upon the breakaway hand guard, such as an impact from a crash, the hand guard causes the pair of mated surfaces to absorb the impact, with the pair of mated surfaces acting as a fulcrum between the main chassis and the handlebar clamp attachment member. As the pair of mated surfaces twist or disengage from one another, the deflecting force of the proximate expansion of the mated contact points is transferred to the shaft assembly, which, in turn, causes the tension or compression of the spring of the shaft assembly to increase. More succinctly, the hand guard flexes at its pair of mated surfaces, allowing them to disengage against one another under the increased compression or tension of the spring.

Once the active force is removed from the hand guard, the increased compression or tension of the spring in the breakaway state causes the shaft assembly to re-acquire to its lower compression resting position, or standard state, causing the plurality of contact points to self-orient and resume the original desired hand guard position where the compression or tension of the spring is lowest.

Various materials can be used for the components of embodiments of the disclosed invention, such as metal, plastic, carbon or other conventional manufacturing materials. The flexible cable used in the shaft assembly can be many materials such as wire rope steel cable, composite cable, rubber or other conventional flexible material, where the material is somewhat flexible and allows the shaft assembly to flex slightly when force is applied.

In addition, many types of material can be used in order to create the hand guard. Metals such as aluminum or stainless steel or other sufficiently strong metals can be used as well as other materials, such as carbon fiber, plastics, or other alloys or combinations thereof. It is further advantageous to attach a hand guard to each end of the handlebar (e.g. both left and right sides of the handlebar). In this configuration the second hand guard is preferably a mirror image of the first hand guard.

It is also noted that the placement of the spring (or other material providing tension or compression) can be placed at alternate positions along or in the shaft assembly. In fact, some embodiments can be anticipated where the spring and shaft assembly are external to the main chassis or handlebar clamp attachment member, providing for various changes due to the nature of the application (e.g. motorcycle vs bicycle vs snowmobile, etc.).

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concepts are capable of modification in various obvious respects all without departing from the inventive concepts. Accordingly, the drawings and description of the preferred embodiments are to be regarded as illustrative in nature, and not as restrictive in nature.

FIG. 1 is an environmental view of an embodiment of a pair of omni-directional self-orienting breakaway hand guards 100 configured on a motorcycle.

Figure 2:
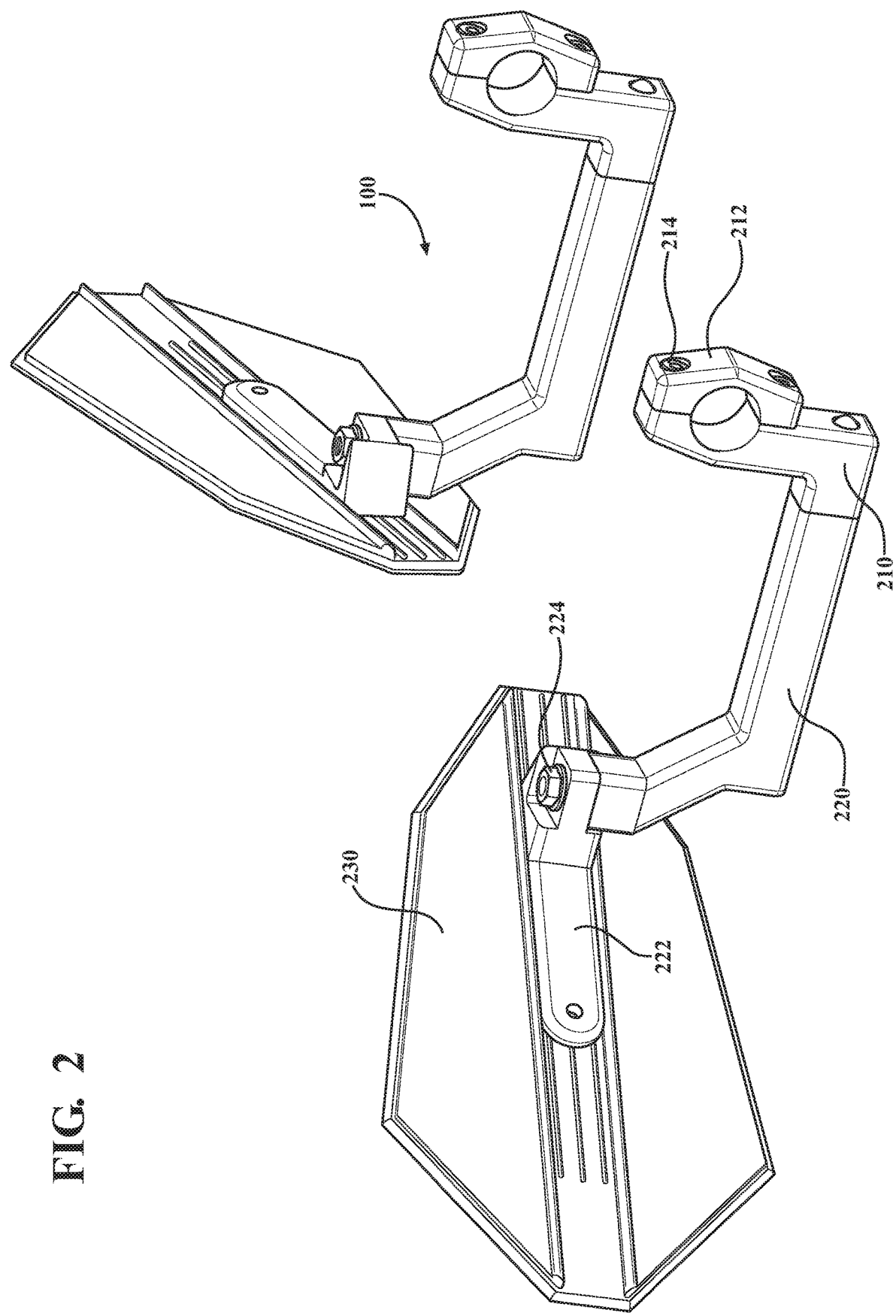
FIG. 2 is an orthographic view of an embodiment of a pair of omni-directional self-orienting breakaway hand guards.

FIG. 2 is an orthographic view of an embodiment of a pair of omni-directional self-orienting breakaway hand guards 100 similar to those illustrated in FIG. 1. The breakaway hand guard 100 comprises a handlebar clamp attachment member 210, a handlebar clamp 212, one or more handlebar clamp bolts 214, a main chassis 220, a shield attachment member 222, a shield attachment member bolt 224 and a shield 230.

The handlebar clamp attachment member 210 may be attached to a handlebar (as illustrated in FIG. 1) via the handlebar clamp 212, secured by one or more handlebar clamp bolts 214. Other conventional attachment means may be used to secure the handlebar clamp 212 to a handlebar (e.g. direct bolt, alternate hardware not utilizing a clamp, adhesive, weld, etc.).

The main chassis 220 and handlebar clamp attachment member 210 are illustrated in a resting standard state. The main chassis 220 may be proximate to and communicate with the handlebar clamp attachment member 210. The main chassis 220 may be selectively secured to the shield attachment member 222 with a shield attachment member bolt 224 or other conventional means (e.g. locking hardware, pinned, adhesive, weld, etc.). As the main chassis 220 and the shield attachment member 222 may be rotatably secured to one another, the shield attachment member 222 may be placed in a position or orientation relative to the main chassis before securing with the shield attachment member bolt 224. In other embodiments, the shield attachment member 222 and the main chassis 220 may be a single structure without the capability of rotational adjustment.

Figure 3:
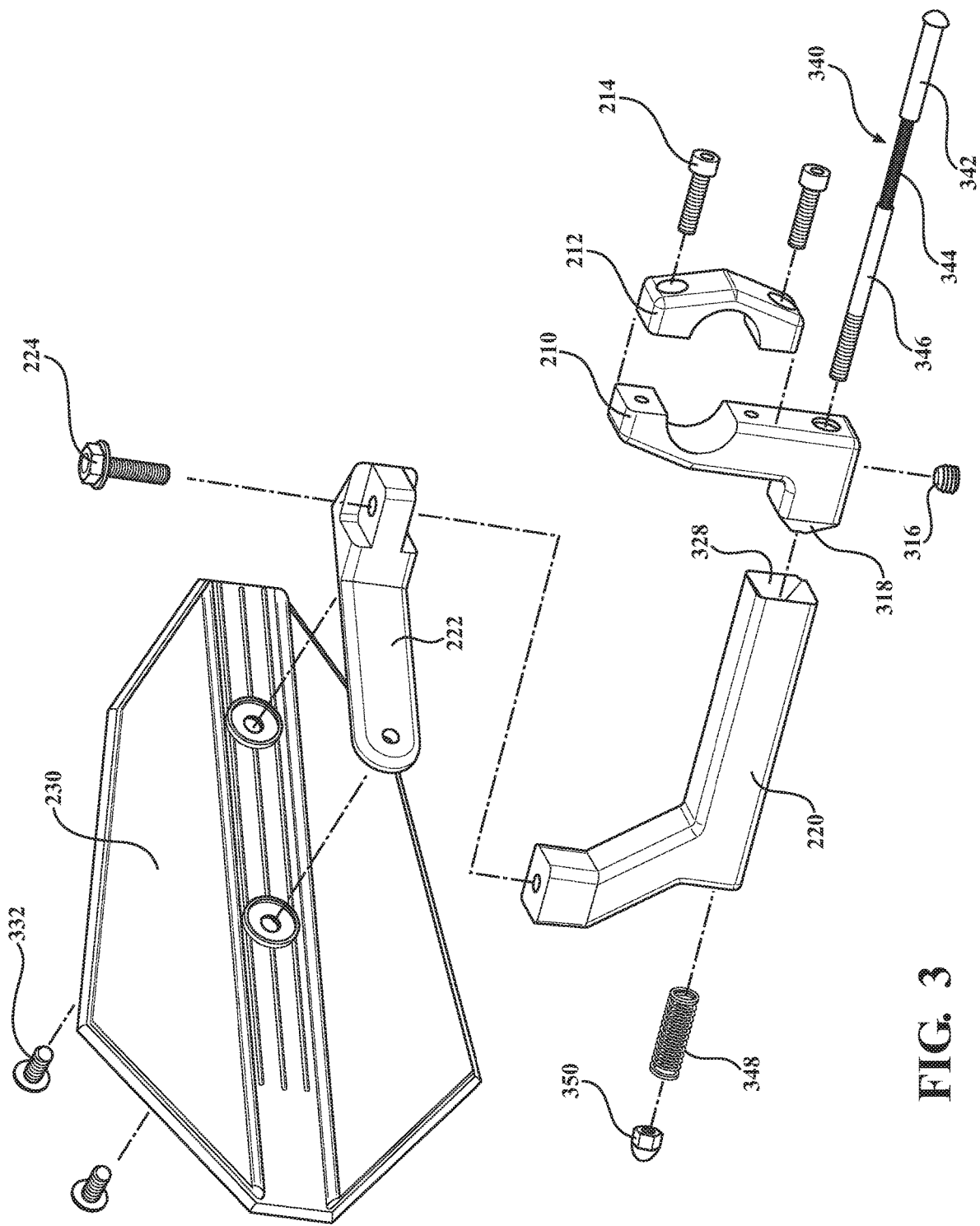
FIG. 3 is an exploded view of an embodiment of a pair of omni-directional self-orienting breakaway hand guards.

FIG. 3 is an exploded view of an embodiment of a pair of omni-directional self-orienting breakaway hand guards similar to the omni-directional self-orienting breakaway hand guards of FIGS. 1 and 2, wherein the individual components may be viewed separately rather than assembled in FIGS. 1 and 2.

The communication between the main chassis 220 and the handlebar clamp attachment member 210 occurs with a pair of mated surfaces 318 and 328, namely a first mated surface 318 on the handlebar clamp attachment member 210, and a second mated surface 328 on the main chassis 220. As illustrated, the first mated surface 318 may comprise a plug, or protruding/male shaped surface. The plug may be cylindrical or have multiple sides, facets or edges such as the shape of a pyramid (e.g. four-sided pyramid as illustrated). The second mated surface 328 as illustrated is a socket or recessed/female shaped surface, capable of accommodating the first mated surface 318. In other embodiments, the male/female or plug/socket shaped surfaces may be reversed, such that the first mated surface 318 is a socket and the second mated surface 328 is a plug, without departing from embodiments disclosed herein. In yet other embodiments, the pair of mated surfaces do not need to resemble a plug/socket or male/female configuration and may be any complimentary pair of mated surfaces. Thus, any pair of mated surfaces may be utilized provided that when used in concert, the pair of mated surfaces encourage the handlebar clamp attachment member 210 and main chassis 220 to self-position and self-orient with respect to one another when under compression or tension (as described herein) between the handlebar clamp attachment member 210 and main chassis 220.

A shaft assembly 340 comprises a first end 342, a flexible middle portion 344 and a second end 346. The middle flexible portion 344 may be a cable as illustrated, wherein the cable of the flexible middle portion 344 is swaged to the first end 342 and swaged to the second end 346. Other attachment means rather than swaging may be used with success, including conventional hardware, pinning, adhesive, welding or other conventional means to attach a cable to a cylindrical/dowel shaped component.

The axial core is inserted, and passes through, the handlebar clamp attachment member 210 and the main chassis 220, and is secured therein.

The second end 346 may be threaded so as to accept a nut 350 and secure the shaft assembly 340 within the handlebar clamp attachment member 210 and the main chassis 220. A spring 348 may be inserted or placed around the shaft assembly 340 so as to create compression or tension between the handlebar clamp attachment member 210 and the main chassis 220. After the shaft assembly 340 is inserted or installed within the handlebar clamp attachment member 210 and main chassis 220, a set screw 316 may be installed to secure the shaft assembly 340 to the handlebar clamp attachment member 210.

The shield 230 may be secured to the shield attachment member 222 via one or more shield attachment bolts 332.

Figure 4:
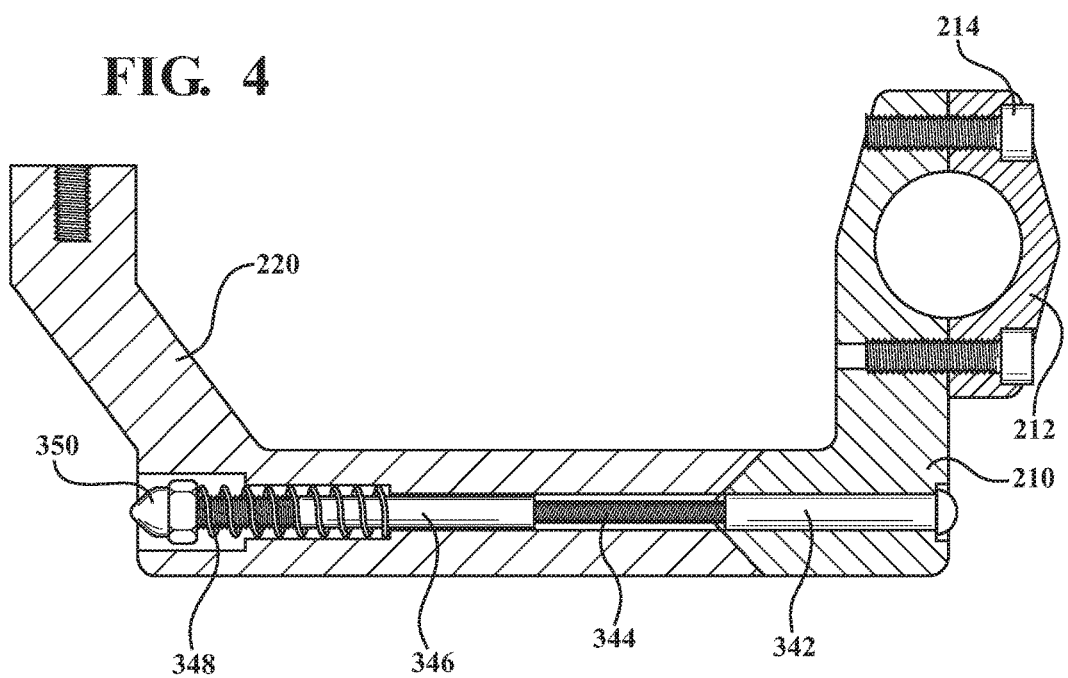
FIG. 4 is a cutaway view of an embodiment of a main chassis and handlebar clamp attachment member in a resting standard state.

FIG. 4 is a cutaway view of an embodiment of a main chassis and handlebar clamp attachment member, similar to those disclosed in FIGS. 1-3, in a resting standard state. It is noted that in this figure, the handlebar clamp attachment member 210 and main chassis 220 are in the closest communication and proximity possible, with normal compression is exhibited on the spring 348, based on the normal length of the spring.

Under a significant force applied to the main chassis 220 (e.g. during a crash or other impact), the spring 348 installed upon the shaft assembly 340 will experience increased compression, allowing the first mated surface 318 and second mated surface 328 to disengage or otherwise deflect, extend and disorient from one another in a breakaway state. This disengagement or disorientation allows the hand guard to "breakaway" such that a user's hand will not be caught in the hand guard. In addition, such a breakaway feature allows the hand guard to be resistant to breakage or permanent bending as it can absorb impact.

Figure 5:
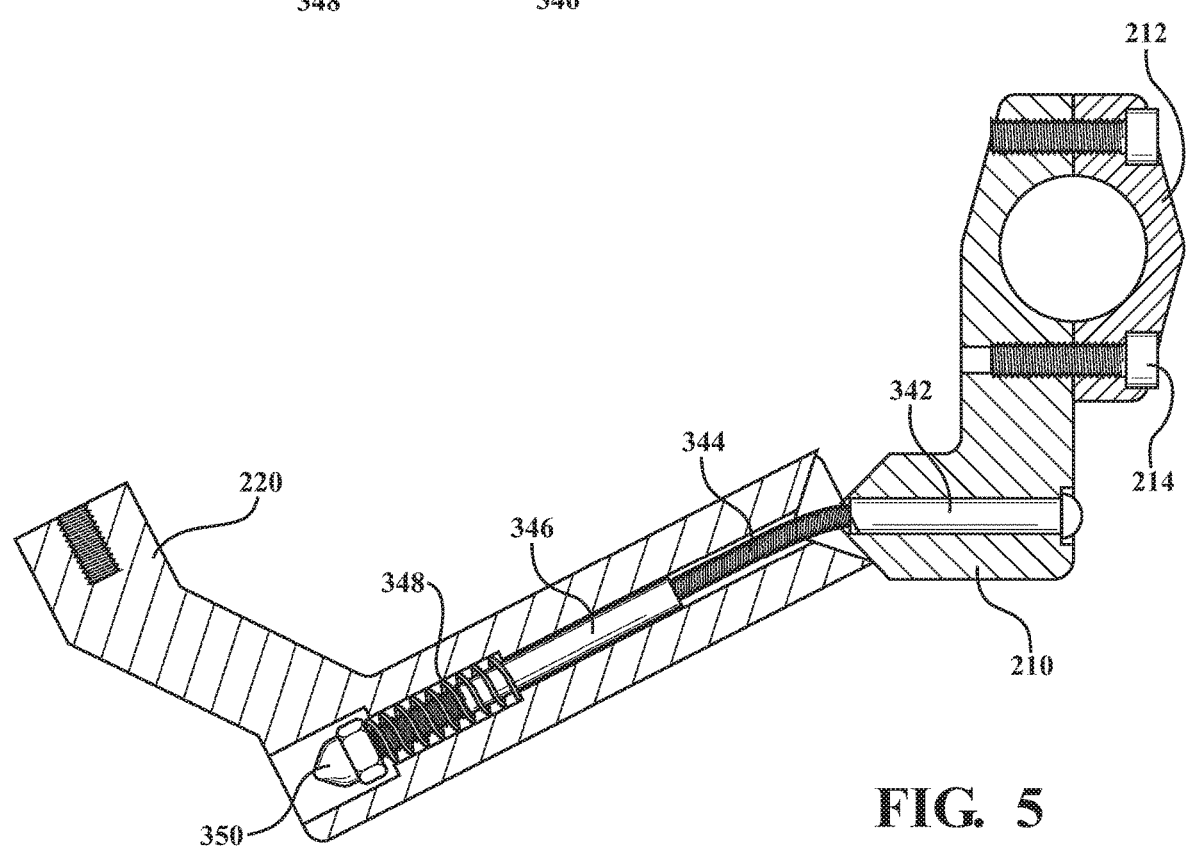
FIG. 5 is a cutaway view of an embodiment of a main chassis and handlebar clamp attachment member in a deflected breakaway state.

FIG. 5 is a cutaway view of an embodiment of a main chassis and handlebar clamp attachment member, similar to those disclosed in FIGS. 1-4, in a deflected breakaway state. In this figure, in contrast to FIG. 4, the main chassis 220 is deflected downward in a breakaway state from an active force (e.g. an impact or crash). Increased compression is exhibited on the spring 348, based on the shortened length of the spring. The flexible middle portion 344 is shown as flexing to accommodate the change in relative position and orientation of the handlebar clamp attachment member 210 to the main chassis 220. It would be expected that following removal of the active force applied to deflect the main chassis 220 into its breakaway state, the main chassis 220 would re-position, re-orient and re-seat itself onto the handlebar clamp attachment member, thereby returning the handlebar clamp attachment member 210 and main chassis 220 to a standard state (shown in FIG. 4) due to the increased compression of the spring 348.

Assembly

Returning to FIG. 4, the assembly and configuration of the omni-directional self-orienting breakaway hand guard may be accommodated with the following steps.

The shield attachment member 222 may be attached to the main chassis 220 with a shield attachment member bolts 224. Other attachment means may be used (e.g. pinning, press fit, adhesive, welding, etc.) without departing from embodiments.

The shield 230 may be attached to the shield attachment member 222 with one or more shield attachment bolts 332. Other attachment means may be used (e.g. pinning, press fit, adhesive, welding, etc.) without departing from embodiments.

The flexible middle portion 344 may be swaged to the first end 342. Other attachment means may be used (e.g. pinning, press fit, adhesive, welding, etc.) without departing from embodiments.

The flexible middle portion 344 may be swaged to the second end 346. Other attachment means may be used (e.g. pinning, press fit, adhesive, welding, etc.) without departing from embodiments.

The shaft assembly 340 may be inserted into and through the handlebar clamp attachment member 210, and thereafter into and through the main chassis 220. The spring 348 may be placed on the shaft assembly 340. The shaft assembly 340 may be secured in place with the nut 350. Other attachment means may be used (e.g. pinning, press fit, adhesive, welding, etc.) without departing from embodiments.

The shaft assembly set screw 316 may be secured into the handlebar clamp attachment member 210 to secure the shaft assembly 340 to the handlebar clamp attachment member 210. Other attachment means may be used (e.g. pinning, press fit, adhesive, welding, etc.) without departing from embodiments.

The handlebar clamp attachment member 210 may be secured to vehicle handlebars (as illustrated in FIG. 1) in a desired position and orientation using the handlebar clamp 212 using one or more handlebar clamp bolts 314. Other attachment means may be used (e.g. pinning, press fit, adhesive, welding, etc.) without departing from embodiments.

CONCLUSION

There are numerous and diverse additional embodiments anticipated by the present invention. Therefore, it is further understood that the following examples are not limiting by nature, but rather alternate specific examples where the disclosed apparatus and method can be utilized.

The novel and useful approaches described herein evidence a variety of benefits over prior art approaches. In particular, embodiments of the present invention provide one or more additional aspects of enhanced convenience, usability and reliability over the prior art.

Preferred embodiments of this invention are described herein, including the best mode known to the inventors for carrying out the invention. As can be appreciated from the technical disclosure herein, embodiments of the present invention evidence a variety of advances and benefits over the prior art, uniquely and advantageously yielding savings of time, effort, and cost relative to the existing prior art currently utilized. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention. Groupings of alternative elements or embodiments of the invention disclosed herein are not to be construed as limitations. Each group member may be referred to and claimed individually or in any combination with other members of the group or other elements found herein.

Furthermore, if any references have been made to patents and printed publications in this specification, then each of the above cited references and printed publications, if any, are herein individually incorporated by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

I claim:

1. A omni-directional self-orienting breakaway hand guard mounted on handlebars comprising:
a handlebar clamp attachment member, the handlebar clamp attachment member further comprising a handlebar clamp and one or more handlebar clamp bolts, the handlebar clamp and the one or more handlebar clamp bolts securing the handlebar clamp attachment member to the handlebars;
a shield attachment member, the shield attachment member further comprising a shield and one or more shield attachment bolts, the one or more shield attachment bolts securing the shield to the shield attachment member;
a main chassis, wherein the main chassis is attached to the shield attachment member via a shield attachment member bolt and wherein the main chassis and the handlebar clamp attachment member communicate via a pair of mated surfaces, wherein the pair of mated surfaces comprises a first mated surface on the main chassis and a second mated surface on the handlebar clamp attachment member; and
a shaft assembly passing through the main chassis and the handlebar clamp attachment member, thereby creating elastic compression between the main chassis and the handlebar clamp attachment member to place the shield attachment member in a desired position and orientation with respect to the handlebar clamp attachment member.

2. The omni-directional self-orienting breakaway hand guard of claim 1 wherein the first mated surface is a plug and the second mated surface is a socket configured to accommodate the first mated surface.

3. The omni-directional self-orienting breakaway hand guard of claim 1 wherein the first mated surface is shaped as a multi-sided pyramid, and the second mated surface is shaped to accommodate the first mated surface.

4. The omni-directional self-orienting breakaway hand guard of claim 1 wherein the first mated surface is shaped as a four-sided pyramid, and the second mated surface is shaped to accommodate the first mated surface.

5. The omni-directional self-orienting breakaway hand guard of claim 1 wherein the shaft assembly further comprises a first end, a flexible middle portion, and a second end.

6. The omni-directional self-orienting breakaway hand guard of claim 5 wherein the flexible middle portion is a cable.

7. The omni-directional self-orienting breakaway hand guard of claim 6 wherein the flexible middle portion of cable is swaged to the first end and second end.

8. The omni-directional self-orienting breakaway hand guard of claim 5 wherein the second end of the shaft assembly is threaded, and the shaft assembly further comprises a nut to secure the shaft assembly within the handlebar clamp attachment member and the main chassis.

9. The omni-directional self-orienting breakaway hand guard of claim 1 wherein the shaft assembly comprises a spring to provide elastic compression.

10. A method of assembling a self-orienting omni-directional self-orienting breakaway hand guard, comprising steps of:
providing a handlebar clamp attachment member, the handlebar clamp attachment member having a first mated surface;
providing a main chassis, the main chassis having a second mated surface;
providing a shield attachment member and a shaft assembly;
securely attaching the main chassis to the shield attachment member;
installing the shaft assembly through the handlebar clamp attachment member and the main chassis, wherein the first mated surface and the second mated surface are in a mated configuration, and wherein the handlebar clamp attachment member and the main chassis communicate under compression.

11. The method of assembling a self-orienting omni-directional self-orienting breakaway hand guard of claim 10 further comprising attaching a shield to the shield attachment member with one or more shield attachment bolts.

12. The method of assembling a self-orienting omni-directional self-orienting breakaway hand guard of claim 10 wherein the step of securely attaching the main chassis to the shield attachment member is via a shield attachment member bolt.

13. The method of assembling a self-orienting omni-directional self-orienting breakaway hand guard of claim 10 wherein the shaft assembly comprises a first end, a second end and a middle flexible portion.

14. The method of assembling a self-orienting omni-directional self-orienting breakaway hand guard of claim 13 wherein the middle flexible portion is a cable, further comprising steps of: (i) swaging the cable to the first end and (ii) swaging the cable to the second end.

15. The method of assembling a self-orienting omni-directional self-orienting breakaway hand guard of claim 10 wherein the shaft assembly comprises a first end, a threaded second end and a middle flexible portion, and wherein the step of installing the shaft assembly further comprises steps of: (i) inserting the shaft assembly through the handlebar clamp attachment member and the main chassis, and (ii) attaching a nut to the threaded second end.

16. The method of assembling a self-orienting omni-directional self-orienting breakaway hand guard of claim 10 wherein the shaft assembly comprises a first end, a threaded second end and a middle flexible portion, and wherein the step of installing the shaft assembly further comprises steps of: (i) inserting the shaft assembly through the handlebar clamp attachment member and the main chassis, (ii) inserting a spring on the shaft assembly, and (iii) attaching a nut to the threaded second end.

17. The method of assembling a self-orienting omni-directional self-orienting breakaway hand guard of claim 10 further comprising installing a shaft assembly set screw after installing the shaft assembly.

18. The method of assembling a self-orienting omni-directional self-orienting breakaway hand guard of claim 10:
wherein the step of securely attaching the main chassis to the shield attachment member is via a shield attachment member bolt;
wherein the shaft assembly comprises a first end, a threaded second end and a middle flexible portion, wherein the middle flexible portion is a cable;
wherein the step of installing the shaft assembly further comprises steps of: (i) inserting the shaft assembly through the handlebar clamp attachment member and the main chassis, (ii) inserting a spring on the shaft assembly, and (iii) attaching a nut to the threaded second end; and further comprising steps of:
attaching a shield to the shield attachment member with one or more shield attachment bolts;
swaging the cable to the first end;
swaging the cable to the threaded second end; and
installing a shaft assembly set screw after installing the shaft assembly.

19. A omni-directional self-orienting breakaway hand guard mounted on handlebars comprising:
a handlebar clamp attachment member, the handlebar clamp attachment member further comprising a handlebar clamp and one or more handlebar clamp bolts, the handlebar clamp and the one or more handlebar clamp bolts securing the handlebar clamp attachment member to the handlebars;
a shield attachment member, the shield attachment member further comprising a shield and one or more shield attachment bolts, the one or more shield attachment bolts securing the shield to the shield attachment member;
a main chassis, wherein the main chassis is attached to the shield attachment member via a shield attachment member bolt and wherein the main chassis and the handlebar clamp attachment member communicate via a pair of mated surfaces, wherein the pair of mated surfaces comprises a first mated surface on the main chassis and a second mated surface on the handlebar clamp attachment member, wherein the first mated surface is a plug and the second mated surface is a socket shaped to accommodate the first mated surface; and
a shaft assembly passing through the main chassis and the handlebar clamp attachment member, the shaft assembly comprising a first end, a flexible middle portion, a threaded second end, a spring to provide elastic compression and a nut;
wherein the flexible middle portion comprises a cable, the cable swaged to the first end and the cable swaged to the threaded second end;
wherein the nut secures the shaft assembly within the handlebar clamp attachment member and the main chassis; and,
wherein the shaft assembly creates elastic compression between the main chassis and the handlebar clamp attachment member to place the shield attachment member in a desired position and orientation with respect to the handlebar clamp attachment member.

\* \* \* \* \*